US012787944B2

(12) United States Patent
Huo et al.

(10) Patent No.: US 12,787,944 B2
(45) Date of Patent: Nov. 10, 2026

(54) HEDGE TRIMMER

(71) Applicant: JIANGSU DONGCHENG TOOLS TECHNOLOGY CO., LTD., Nantong (CN)

(72) Inventors: Lixiang Huo, Nantong (CN); Gongyuan Fan, Nantong (CN)

(73) Assignee: JIANGSU DONGCHENG TOOLS TECHNOLOGY CO., LTD., Nantong (CN)

(*) Notice: Subject to any disclaimer, the term of this patent is extended or adjusted under 35 U.S.C. 154(b) by 190 days.

(21) Appl. No.: 18/510,704

(22) Filed: Nov. 16, 2023

(65) Prior Publication Data

US 2024/0081192 A1 Mar. 14, 2024

Related U.S. Application Data

(63) Continuation of application No. PCT/CN2022/133037, filed on Nov. 19, 2022.

(30) Foreign Application Priority Data

Nov. 30, 2021 (CN) ........................ 202111441890.6

(51) Int. Cl.
*A01G 3/08* (2006.01)
*A01G 3/053* (2006.01)
*B25F 5/02* (2006.01)

(52) U.S. Cl.
CPC ............ *A01G 3/085* (2013.01); *A01G 3/053* (2013.01); *B25F 5/02* (2013.01)

(58) Field of Classification Search
CPC ........... B25F 5/02; A01G 3/047; A01G 3/053; A01G 3/0461; A01G 3/085; A01G 3/075
See application file for complete search history.

(56) References Cited

U.S. PATENT DOCUMENTS

| | | | | |
|---|---|---|---|---|
| 9,308,637 | B2 * | 4/2016 | Tsuchiya | B25F 5/02 |
| 12,588,588 | B2 * | 3/2026 | McGrath | A01D 34/416 |
| 2012/0317821 | A1 | 12/2012 | Tsuchiya et al. | |

FOREIGN PATENT DOCUMENTS

| | | |
|---|---|---|
| CN | 202635184 U | 1/2013 |
| CN | 102781222 B | 4/2014 |

(Continued)

OTHER PUBLICATIONS

CN-208708205-U English translation; Apr. 9, 2019 Zou, Liang, A01G3/053.*

(Continued)

*Primary Examiner* — Laura M Lee

(57) ABSTRACT

The present application relates to a hedge trimmer. A rear machine body can rotate relative to a front machine body. The rear machine body includes a rotary unlocking trigger and a microswitch disposed on one side of the rotary unlocking trigger. The microswitch is a normally closed switch and is electrically connected to a power supply circuit. The rotary unlocking trigger has a first position and a second position relative to the front machine body. In response to the rotary unlocking trigger is at the first position, the rear machine body is fixed relative to the front machine body, and the power supply circuit is conducted; in response to the rotary unlocking trigger is at the second position, the rear machine body rotates relative to the front machine body, and the power supply circuit is disconnected.

11 Claims, 4 Drawing Sheets

(56) References Cited

FOREIGN PATENT DOCUMENTS

| | | | | | |
|---|---|---|---|---|---|
| CN | 204681952 | U | | 10/2015 | |
| CN | 208708205 | U | * | 4/2019 | ............. A01G 3/053 |
| CN | 210444963 | U | | 5/2020 | |
| CN | 114223419 | A | | 3/2022 | |
| CN | 216820810 | U | | 6/2022 | |
| JP | 2005180897 | A | | 7/2005 | |
| JP | 2008543275 | A | * | 12/2008 | ............. A01G 3/053 |
| JP | 2010138814 | A | | 6/2010 | |
| WO | WO-2006134749 | A2 | * | 12/2006 | ............. A01G 3/053 |

OTHER PUBLICATIONS

International Search Report, International Application No. PCT/CN2022/133037, mailed Jan. 28, 2023 (13 pages).
Chinese First Office Action, Chinese Application No. 202111441890.6, mailed Nov. 29, 2024 (12 pages).
Chinese Second Office Action, Chinese Application No. 202111441890.6, mailed Jul. 25, 2025 (14 pages).
Chinese Third Office Action, Chinese Application No. 202111441890.6, mailed Nov. 10, 2025 (20 pages).

* cited by examiner

HEDGE TRIMMER

CROSS-REFERENCE TO RELATED APPLICATIONS

The present application is a continuation of International Patent Application No. PCT/CN2022/133037 filed on Nov. 19, 2022, which claims priority to Chinese Patent Application No. 202111441890.6, filed on Nov. 30, 2021, the contents of all of which are hereby incorporated by reference.

TECHNICAL FIELD

The present disclosure relates to garden electric tools, and in particular to a hedge trimmer.

BACKGROUND

The hedge trimmer, as a commonly used garden electric tool, can be used for trimming shrubs and hedges, with the advantages of convenient operation, high cutting efficiency and the like. The main components of the hedge trimmer include a blade assembly, a front machine body and a rear machine body. Due to the fixed structure of the front machine body and the rear machine body of a traditional hedge trimmer, the usage state of the traditional hedge trimmer cannot be changed. It is necessary for operators to frequently adjust the posture of the human body or arms to rotate the traditional hedge trimmer to change the usage state in response to trimming the work surfaces at different angles, such as oblique cutting or vertical cutting. Thus, the operation is inconvenient and the traditional hedge trimmer can only adapt to simple horizontal surface cutting, and the trimming requirement is difficult to meet.

With the development of technology, some companies have developed a machine type with the rear machine body capable of rotating, but this machine type still has the defects that the rear machine body can still be operated to rotate in the process of high-speed reciprocating trimming of a blade of the hedge trimmer, which is prone to accidents and personal injury to the operator.

SUMMARY OF THE DISCLOSURE

A first aspect of the present disclosure provides a hedge trimmer including a front machine body, a blade assembly connected to an axial front end of the front machine body, and a rear machine body connected to an axial rear end of the front machine body. The front machine body includes a motor configured to drive the blade assembly to reciprocate, the rear machine body includes a power supply circuit electrically connected with the motor and a power supply connected to the rear machine body, and the power supply is configured to supply power to the motor through the power supply circuit. The rear machine body is configured to rotate relative to the front machine body, the rear machine body includes a rotary unlocking trigger and a first microswitch arranged on a side of the rotary unlocking trigger, and the first microswitch is a normally closed switch and is electrically connected to the power supply circuit. The rotary unlocking trigger is configured to be at a first position and a second position relative to the front machine body. In response to the rotary unlocking trigger is at the first position, the rotary unlocking trigger catches the front machine body and is away from the first microswitch, at this time, the rear machine body is fixed relative to the front machine body, and the power supply circuit is conducted. In response to the rotary unlocking trigger is at the second position, the rotary unlocking trigger disengages from the front machine body and triggers the first microswitch, the rear machine body rotates relative to the front machine body, and the power supply circuit is disconnected.

In some embodiments, the front machine body has a cylindrical rotating shaft part on a rear end of the front machine body, the rotating shaft part defines a plurality of lock holes distributed on an outer peripheral surface of the rotating shaft part, the rotary unlocking trigger is provided with a lock pin located at the front end of the rotary unlocking trigger and matched with one or more lock holes, and in response to the rotary unlocking trigger is at the first position, the lock pin is inserted into the one or more lock holes, and the rear machine body is fixed relative to the front machine body; in response to the rotary unlocking trigger is at the second position, the lock pin is separated from the one or more lock holes, and the rear machine body rotates relatively to the front machine body.

In some embodiments, the rotary unlocking trigger and the rear machine body form a sliding connection or a rotating connection, and the rear end of the rotary unlocking trigger is exposed out of the rear machine body and configured to be operated by an operator.

In some embodiments, the rotary unlocking trigger is provided with a hook-shaped part that is located at the rear end and is exposed out of the rear machine body, and a free end of the hook-shaped part is bent towards a lower side of the rear machine body.

In some embodiments, the rear machine body is provided with an elastic piece located between the lock pin and an inner wall of the rear machine body, and the elastic piece and the first microswitch are located on the same side of the rotary unlocking trigger.

In some embodiments, the one or more lock holes are arranged at the same intervals along a circumferential direction of the rotating shaft part.

In some embodiments, the plurality of locking holes forms a plurality of locations with rotatable angles of the front machine body relative to the rear machine body, and an angle difference of adjacent locations is 45 degrees.

In some embodiments, the front machine body is provided with a first handle extending in a transverse direction that is perpendicular to an axial direction of the front machine body, the first handle includes a holding part arranged transversely and connecting parts that are respectively connected with the front machine body from two transverse ends of the holding part, an elastic component is arranged between the connecting parts and the front machine body, and the elastic component is rubber or a spring.

In some embodiments, the rear machine body is provided with a second handle extending along an axial direction of the rear machine body and a starting trigger configured to control starting the motor, and the starting trigger and the rotary unlocking trigger are respectively located on an upper side and a lower side of an inner ring of the second handle.

In some embodiments, the power supply includes a battery pack, the rear machine body is provided with the battery pack, a straight line that passes through a gravity center of the blade assembly and is parallel to an axial direction of the rear machine body is taken as a halving line, and the gravity center of the hedge trimmer installed with the battery pack is located on a side of the halving line.

A second aspect of the present disclosure provides a hedge trimmer including a front machine body, a blade assembly connected to an axial front end of the front machine body, a rear machine body connected to an axial rear end of the front machine body, and a battery pack. The front machine body includes a motor configured to drive the blade assembly to reciprocate, the rear machine body includes a power supply circuit electrically connected with the motor, a battery pack is connected to the rear machine body, and the battery pack is configured to supply power to the motor through the power supply circuit; the rear machine body is configured to rotate relative to the front machine body, the rear machine body includes a rotary unlocking trigger and a first microswitch arranged on a side of the rotary unlocking trigger, and the first microswitch is a normally closed switch and is electrically connected to the power supply circuit; the rotary unlocking trigger is configured to be at a first position and a second position relative to the front machine body, in response to the rotary unlocking trigger is at the first position, the rotary unlocking trigger catches the front machine body and is away from the first microswitch, at this time, the rear machine body is fixed relative to the front machine body, and the power supply circuit is conducted; in response to the rotary unlocking trigger is at the second position, the rotary unlocking trigger disengages from the front machine body and triggers the first microswitch, the rear machine body rotates relative to the front machine body, and the power supply circuit is disconnected.

A third aspect of the present disclosure provides a hedge trimmer. The hedge trimmer includes a front machine body, a blade assembly connected to an axial front end of the front machine body, a rear machine body connected to an axial rear end of the front machine body; and a starting trigger. The front machine body includes a motor configured to drive the blade assembly to reciprocate and a plurality of lock holes, the rear machine body includes a power supply circuit electrically connected to the motor and a power supply connected to the rear machine body, and the power supply is configured to supply power to the motor through the power supply circuit. The rear machine body defines a rotary unlocking trigger that is configured to unlock rotating states of the front machine body and the rear machine body, a first microswitch and an elastic piece. The rotary unlocking trigger includes a grip part disposed below the starting trigger, a lock part and a rotating shaft between the grip part and the lock part. A side of the lock part defines a lock pin matched with the one or more lock holes and the other side of the lock part that abuts against the elastic piece. In response to the lock pin engages with one of the plurality of lock holes, the first microswitch is closed and the power supply circuit is conducted. In response to the lock pin disengages from one of the plurality of lock holes, the rear machine body is configured to rotate relative to the front machine body, the other side of the lock part compresses the elastic piece, so that the elastic piece deforms, the first microswitch is disconnected, and the power supply circuit is disconnected.

In some embodiments, the first microswitch is between the rotary unlocking trigger and the rotating shaft.

BRIEF DESCRIPTION OF THE DRAWINGS

The embodiments of the present disclosure will be further explained in detail in conjunction with the accompanying drawings.

DETAILED DESCRIPTION

The technical solutions of the present disclosure will be clearly and completely described below in conjunction with the accompanying drawings. Obviously, the described embodiments are part of the embodiments of the present disclosure, but not all embodiments. Based on the embodiments of the present disclosure, other embodiments obtained by those of ordinary skill in the art without creative efforts fall within the protection scope of the present disclosure.

In the description of the present disclosure, it is to be noted that unless otherwise expressly specified and limited, the terms "mounted" and "connected" are to be interpreted broadly. For example, it can be fixedly connected, detachably connected, or integrally connected; it can be mechanical connection or electric connection; it can be directly connected, or indirectly connected through an intermediate medium, or can be a connection between the interior of two elements. Those skilled in the art can understand the specific meanings of the above terms in the present disclosure.

Aiming at the defects in the existing technology, the present disclosure aims to provide a hedge trimmer that improves safety and is easy to operate.

Figure 1:
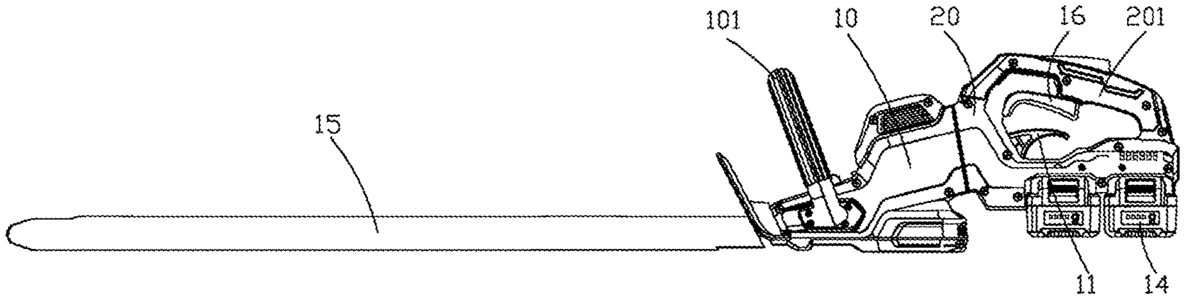
FIG. 1 is an overall schematic view of a hedge trimmer of the present disclosure.

A hedge trimmer provided by an embodiment of the present disclosure is a horticultural cutting tool for outdoor trimming of vegetation such as shrubs, hedges, or the like. Referring to FIG. 1, an axial direction of a machine body is defined as the front-back direction, the hedge trimmer at least includes a blade assembly 15, a protective cover for preventing splashes, a front machine body 10 with a first handle 101 and a rear machine body 20 with a second handle 201 that are connected in sequence along the axial direction of the machine body. The machine body refers to a machine body of the hedge trimmer. The blade assembly 15 is arranged at the axial front end of the front machine body 10. The front machine body 10 includes a motor connected to the blade assembly 15, and the motor is used to drive the blade assembly 15 to reciprocate. The rear machine body 20 includes a power supply circuit electrically connected to the motor and a power supply connected to the rear machine body 20, and the power supply is configured to supply power to the motor through the power supply circuit. The blade assembly 15 has an upper shearing blade and a lower shearing blade. The two shearing blades extend forwards from the front machine body 10, and have edge parts. The motor drives a transmission element to carry out eccentric operation through an output shaft, thereby achieving relative reciprocating motion of the two shearing blades of the blade assembly 15. In response to the blade assembly 15 moves along the surface of the vegetation, the cutting function can be realized.

Figure 2:
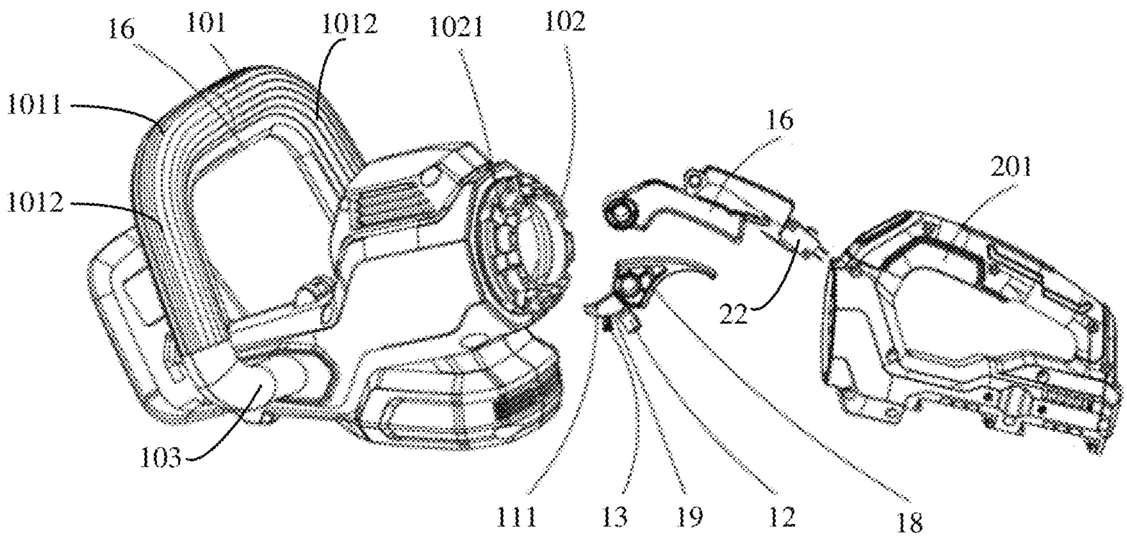
FIG. 2 is an exploded schematic view of a connecting part, of a front machine body and a rear machine body of the hedge trimmer shown in FIG. 1.
Figure 3:
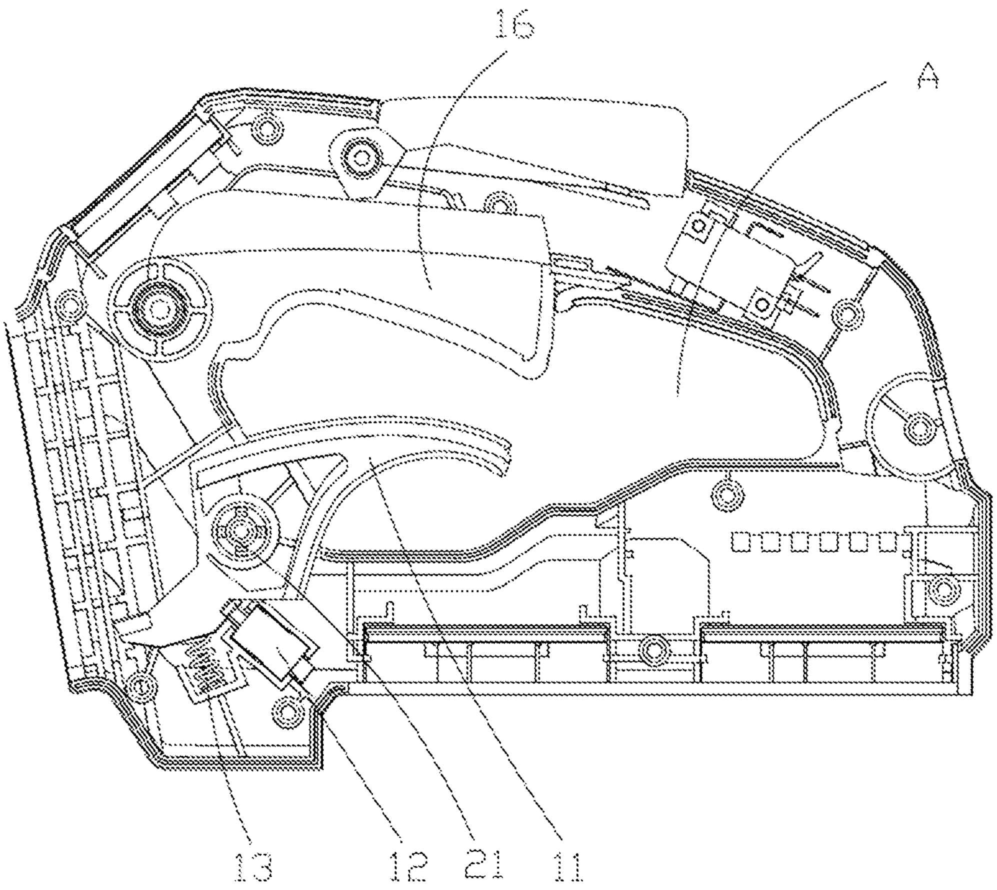
FIG. 3 is a cross-sectional schematic view of the connecting part of the front machine body and the rear machine body of the hedge trimmer shown in FIG. 1.

Aiming at different scenes such as the horizontal surface and the side surface of the vegetation, an operator needs to switch between a flat cutting operation and a side cutting operation. In response to the front machine body 10 rotates relative to the rear machine body 20, the orientation of the blade assembly 15 can be changed to horizontal, oblique, or vertical. Referring to FIGS. 2 and 3, in an embodiment of the present disclosure, the front machine body 10 has a cylindrical rotating shaft part 102 located on a rear end. The rotating shaft part 102 defines a plurality of lock holes 1021 that are uniformly distributed on the outer peripheral surface of the rotating shaft part 102. The rear machine body 20 is connected with a rotary unlocking trigger 11, and the rotary unlocking trigger 11 is used for unlocking the rotating states of the front machine body 10 and the rear machine body 20. The rotary unlocking trigger 11 and the rear machine body 20 form a sliding connection or a rotating connection. A lock pin 111 matched with one or more lock holes 1021 is formed on the front end of the rotary unlocking trigger 11. The rear end of the rotary unlocking trigger 11 is exposed out of the rear machine body 20 for being pushed by the operator, so that the rotary unlocking trigger 11 moves relative to the rear machine body 20 upon being pushed by the operator. In response to the rotary unlocking trigger 11 is at an initial first position, the lock pin 111 is inserted into the one or more lock holes 1021 and is kept at the locked position as long as no external force is applied, and the front machine body 10 is fixed relative to the rear machine body 20 at this time. In response to the rotary unlocking trigger 11 is pushed by the operator, so that the rotary unlocking trigger 11 is at a second position after sliding a preset distance or rotating a preset angle relative to the first position, the lock pin 111 can be separated from the one or more lock holes 1021, and the front machine body 10 can rotate relative to the rear machine body 20. The rotary unlocking trigger 11 is connected to a rotating shaft 21. The rotating shaft 21 rotates, to achieve rotation of the rotary unlocking trigger 11 between the first position and the second position.

A plurality of locations can be set based on the rotation angle of the front machine body 10 relative to the rear machine body 20, and the one or more lock holes 1021 are arranged at the same interval along the circumferential direction of the rotating shaft part 102. Each lock hole 1021 corresponds to a location of a rotatable angle of the front machine body 10 relative to the rear machine body 20, and the angle difference value of the adjacent locations is 45 degrees. For example, four locations may be arranged, the front machine body 10 rotates counterclockwise by 45 degrees, 90 degrees, or clockwise by 45 degrees, 90 degrees relative to the rear machine body 20. The 90 degrees is used for trimming horizontal and vertical lines, and the 45 degrees is used for oblique angles and smooth transition, which can meet the requirements of general rough trimming and fine trimming.

In an embodiment of the present disclosure, the second handle 201 is a longitudinal ring-shaped handle extending along the axial direction of the machine body. A starting trigger 16 used for starting the motor and the rotary unlocking trigger 11 used for unlocking the rotating states of the front machine body 10 and the rear machine body 20 are respectively arranged on the upper side and the lower side of an inner ring of the second handle 201, thereby rationally using space and achieving a compact structure. The inner ring of the second handle 201 forms a space A, the rotary unlocking trigger 11 and the starting trigger 16 are located in the space A, and the rotary unlocking trigger 11 is located below the starting trigger 16. Further, the rear end of the rotary unlocking trigger 11, which is exposed out of the rear machine body 20, has a hook-shape part. The free end of the hook-shaped part is bent towards the lower side of the rear machine body 20. In response to the operator holds the second handle 201, the rotary unlocking trigger 11 can be pulled upwards by a forefinger and a middle finger, so that the operation is convenient and ergonomic. An elastic piece 13 is arranged between the lock pin 111 and the rear machine body 20, so that the rotary unlocking trigger 11 can be reset to the initial position in response to the rotary unlocking trigger 11 is not used by the operator.

During operating the blade assembly 15 of the hedge trimmer in the existing technology, the rear machine body 20 can still operate and rotate, which is prone to accidents and personal injury to the operator. Different from the existing technology, in an embodiment of the present disclosure, the hedge trimmer further includes a first microswitch 12 arranged on a side of the rotary unlocking trigger 11. The first microswitch 12 is a normally closed switch and is electrically connected to the power supply circuit of the motor. In response to the rotary unlocking trigger 11 is at the initial first position, the front machine body 10 is fixed relative to the rear machine body 20, and the rotary unlocking trigger 11 is away from the first microswitch 12, so that the power supply circuit of the motor is conducted, and the motor can be started after the starting trigger 16 is pressed. In response to the rotary unlocking trigger 11 is pushed by the operator, so that the rotary unlocking trigger 11 is at the second position after sliding a preset distance or rotating the preset angle relative to the first position, the front machine body 10 can rotate relative to the rear machine body 20, at this time, the unlocking trigger 11 triggers the first microswitch 12, and the power supply circuit is disconnected. Even if the starting trigger 16 is pressed by the operator, the motor still cannot be started because the power supply circuit is in a disconnected state, to ensure safe use.

Referring to FIGS. 2 and 3, in another embodiment of the present disclosure, the hedge trimmer includes the front machine body 10, the blade assembly 15 connected to the axial front end of the front machine body 10, the rear machine body 20 connected to an axial rear end of the front machine body 10, and the starting trigger 16. The front machine body 10 includes the motor configured to drive the blade assembly 15 to reciprocate and the plurality of lock holes 1021. The rear machine body 20 includes the power supply circuit electrically connected to the motor and the power supply connected to the rear machine body 20. The power supply is configured to supply power to the motor through the power supply circuit.

Besides, the rear machine body 20 defines the rotary unlocking trigger 11 that is configured to unlock rotating states of the front machine body 10 and the rear machine body 20, the first microswitch 12 and the elastic piece 13. The rotary unlocking trigger 11 includes a grip part 18 disposed below the starting trigger 16, a lock part 19 and the rotating shaft 21 between the grip part 18 and the lock part 19. A side of the lock part 19 defines the lock pin 111 matched with the one or more lock holes 1021 and the other side of the lock part 19 that abuts against the elastic piece 13. In response to the lock pin 111 engages with one of the plurality of lock holes 13, the first microswitch 12 is closed and the power supply circuit is conducted. In response to the lock pin 111 disengages from one of the plurality of lock holes 1021, the rear machine body 20 is configured to rotate relative to the front machine body 10, the other side of the lock part 19 compresses the elastic piece 13, so that the elastic piece 13 deforms. And accordingly, the first microswitch 12 is disconnected, and the power supply circuit is disconnected. The hedge trimmer further includes a second microswitch 22. The starting trigger 16 of the second handle 201 is arranged on the upper side of the inner ring of the second handle 201, and the grip part 18 is arranged on the lower side of the inner ring of the second handle 201. The second microswitch 22 is arranged on a side of the starting trigger 16, and the second microswitch 22 is triggered by the starting trigger 16. The grip part 18 and the first microswitch 12 are respectively arranged on two opposite sides of the rotating shaft 21. That is, the grip part 18 is arranged on a first side of the rotating shaft 21, the first microswitch 12 is arranged on a second side of the rotating shaft 21, and the first side of the rotating shaft 21 is opposite to the second side of the rotating shaft 21. The starting trigger 16 of the second handle 201 and the grip part 18 are arranged inside the inner ring of the second handle 201.

In an embodiment of the present disclosure, the hedge trimmer includes the first handle 101 disposed on the front machine body 10 and the second handle 201 disposed on the rear machine body 20, for the operator to hold with both hands. To prevent personal injury caused by the operator's accidental start of the hedge trimmer, the first handle 101 and the second handle 201 are both provided with the starting trigger 16. Only in response to the rotary unlocking trigger 11 is in a non-unlocking state, and the starting triggers 16 on the two handles are simultaneously pressed by the operator, the hedge trimmer can be started, so as to improve safety. The first handle 101 is a ring-shaped handle extending in a transverse direction that is perpendicular to the axial direction of the front machine body 10. The first handle 101 includes a holding part 1011 and two connecting parts 1012 that are respectively connected to the left side and right side of the front machine body 10 from the two transverse ends of the holding part 1011. A U-shaped starting trigger 16 extends along the inner side outline of the holding part 1011, and the U-shaped starting trigger 16 can be triggered by pressing the first handle 101 in any direction by the operator.

In response to the hedge trimmer is used, the generated vibration is relatively large, and the vibration can be directly transmitted to the operator holding the handle through the handle. In an embodiment of the present disclosure, an elastic component 103 is arranged between the connecting parts 1012 of the first handle 101 and the front machine body 10, and the elastic component 103 can be a rubber or a spring, so that part of the vibration is absorbed by the elastic component 103 to improve the user experience.

The power supply is connected to the rear machine body 20 and supplies power to the motor through the power supply circuit. The power supply can be connected with a mains supply socket, a battery pack and other external power supplies through power lines to provide electric energy. Alternatively, the battery pack is directly inserted on the machine body to provide electric energy, and the battery pack can be independently disassembled and charged to store electric energy. In an embodiment of the present disclosure, taking the battery pack 14 directly inserted into the machine body as an example for explanation, the battery pack 14 is inserted horizontally from the side or back below the second handle 201 of the rear machine body 20. The weight of the battery pack 14 is balanced with the weight of the blade assembly 15 extending forward, thereby preventing the gravity center of the hedge trimmer from deviating from one of the front direction and rear direction.

Figure 4:
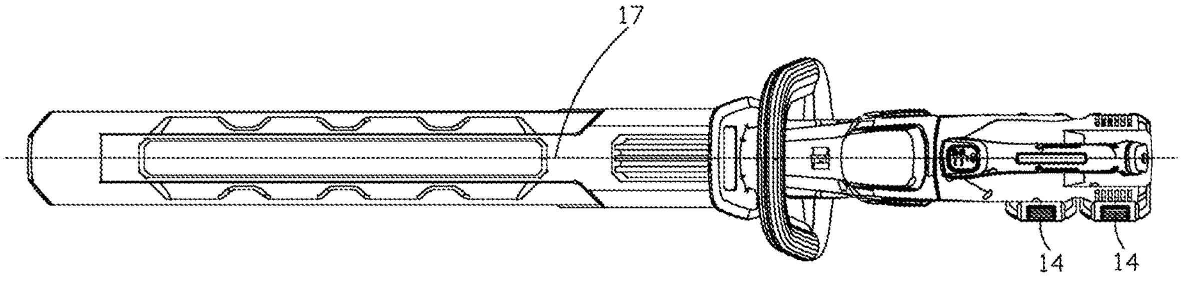
FIG. 4 is a top schematic view of the hedge trimmer shown in FIG. 1.

With the development of technology, the capacity of battery pack continues to increase, and the weight of battery pack accounts for a large proportion of the overall weight of electric tool. Therefore, the position of the gravity center of electric tool will change due to the influence of the battery pack. Referring to FIG. 4, in an embodiment of the present disclosure, a straight line that passes through the gravity center of the blade assembly 15 and is parallel to the axis direction of the machine body is taken as a halving line 17. The machine body is bilaterally symmetrical relative to the halving line 17 in response to the battery pack 14 is not installed, that is, the gravity center of the machine body is also located on the halving line 17. After the battery pack 14 is installed on the machine body, the battery pack 14 is not bilaterally symmetrical with respect to the halving line 17. The part of the battery pack 14 located on the left side of the halving line 17 is more than the part of the battery pack 14 located on the right side of the halving line 17, so that the gravity center of the hedge trimmer is located on the left side of the halving line 17 after the battery pack 14 is installed. Based on statistics, right-handed operators are more than left-handed operators. In response to the hedge trimmer is used, the operator holds the second handle 201 with the right hand and holds the first handle 101 with the left hand, in other words, the hedge trimmer is usually located on the right side of the operator's body. The hedge trimmer of the present disclosure has a gravity center deviated to the left side of the operator's body, so that the posture of using the hedge trimmer is more stable, which is favorable to power distribution and gravity center control of the operator, less fatigue and easy operation.

Compared with the related art, the effects of the present disclosure are as follows. The front machine body can rotate relative to the rear machine body, which is convenient to meet the use requirements of the operator. The rotary unlocking trigger not only controls the rotation of the front machine body and the rear machine body, but also controls the on-off switching of the power supply circuit. During the unlocking state of the rotary unlocking trigger, even if the starting trigger is triggered, the motor cannot be started due to the disconnection of the power supply circuit, ensuring safe use. The rotary unlocking trigger is arranged into a hook shape, so that the operation is convenient, the space is reasonably utilized, and the structure is compact. The gravity center of the whole hedge trimmer is shifted, the posture of using the hedge trimmer is more stable, which is favorable to power distribution and gravity center control of the operator, less fatigue.

In the description of the present specification, the reference terms "an embodiment", "some embodiments", "exemplary embodiment", "example", "specific example", or "some examples" or the like means that a specific feature, structure, material, or characteristic described in conjunction with the embodiment or example is included in at least one embodiment or example of the present disclosure. The foregoing exemplary expressions of terms do not necessarily refer to the same embodiment or example. The specific features, structures, materials, or characteristics described may be combined in any suitable manner in any one or more embodiments or examples.

Although embodiments of the present disclosure have been shown and described, those skilled in the art can understand that various changes, modifications, substitutions, and variations can be made to these embodiments without departing from the principles and spirit of the present disclosure. The scope of the present disclosure is limited by the claims and their equivalents.

What is claimed is:

1. A hedge trimmer, comprising:

a front machine body, provided with a first handle, wherein the first handle is provided with a first starting trigger;

a blade assembly connected to an axial front end of the front machine body; and a rear machine body connected to an axial rear end of the front machine body, wherein the rear machine body is provided with a second handle, and the second handle is provided with a second starting trigger;

wherein the front machine body comprises a motor configured to drive the blade assembly to reciprocate, the rear machine body comprises a power supply circuit electrically connected with the motor and a power supply connected to the rear machine body, and the power supply is configured to supply power to the motor through the power supply circuit;

the rear machine body is configured to rotate relative to the front machine body, the rear machine body comprises a rotary unlocking trigger and a first microswitch arranged on a side of the rotary unlocking trigger, and the first microswitch is a normally closed switch and is electrically connected to the power supply circuit; the rotary unlocking trigger is configured to be at a first position or a second position relative to the front machine body; when the rotary unlocking trigger is at the first position, the rotary unlocking trigger catches the front machine body and is away from the first microswitch, at this time, the rear machine body is fixed relative to the front machine body, and the power supply circuit is conducted; when the rotary unlocking trigger is at the second position, the rotary unlocking trigger disengages from the front machine body and triggers the first microswitch, the rear machine body rotates relative to the front machine body, and the power supply circuit is disconnected; the rotary unlocking trigger comprises a grip part, a lock part, and a rotating shaft; the rotating shaft is between the grip part and the lock part; the grip part is arranged on a first side of the rotating shaft, the first microswitch is arranged on a second side of the rotating shaft, and the first side of the rotating shaft is opposite to the second side of the rotating shaft; the second starting trigger and the grip part are arranged inside an inner ring of the second handle, the second starting trigger is arranged on an upper side of the inner ring of the second handle, and the grip part is arranged on a lower side of the inner ring of the second handle; and when the rotary unlocking trigger is at the first position, and the first starting trigger on the first handle and the second starting trigger on the second handle are simultaneously pressed, the hedge trimmer is started.

2. The hedge trimmer according to claim 1, wherein the front machine body has a cylindrical rotating shaft part on a rear end of the front machine body, the rotating shaft part defines a plurality of lock holes distributed on an outer peripheral surface of the rotating shaft part, the rotary unlocking trigger is provided with a lock pin located at a front end of the rotary unlocking trigger and matched with one or more lock holes, and when the rotary unlocking trigger is at the first position, the lock pin is inserted into the one or more lock holes, and the rear machine body is fixed relative to the front machine body; when the rotary unlocking trigger is at the second position, the lock pin is separated from the one of the one or more lock holes, and the rear machine body rotates relatively to the front machine body.

3. The hedge trimmer according to claim 2, wherein the rotary unlocking trigger and the rear machine body form a sliding connection or a rotating connection, and a rear end of the rotary unlocking trigger is exposed out of the rear machine body and configured to be operated by an operator.

4. The hedge trimmer according to claim 3, wherein the rotary unlocking trigger is provided with a hook-shaped part that is located at the rear end of the rotary unlocking trigger and is exposed out of the rear machine body, and a free end of the hook-shaped part is bent towards a lower side of the rear machine body.

5. The hedge trimmer according to claim 3, wherein the rear machine body is provided with an elastic piece located between the lock pin and an inner wall of the rear machine body, and the elastic piece and the first microswitch are located on the same side of the rotary unlocking trigger.

6. The hedge trimmer according to claim 2, wherein the one or more lock holes are arranged at the same intervals along a circumferential direction of the rotating shaft part.

7. The hedge trimmer according to claim 6, wherein the plurality of locking holes forms a plurality of locations with rotatable angles of the front machine body relative to the rear machine body, and an angle difference of adjacent locations is 45 degrees.

8. The hedge trimmer according to claim 1, wherein the first handle extends in a transverse direction that is perpendicular to an axial direction of the front machine body, the first handle comprises a holding part arranged transversely and connecting parts that are respectively connected with the front machine body from two transverse ends of the holding part, an elastic component is arranged between the front machine body and each of the connecting parts, and the elastic component is rubber or a spring.

9. The hedge trimmer according to claim 1, wherein the second handle extends along an axial direction of the rear machine body, and the second starting trigger is configured to control starting of the motor, and the second starting trigger and the rotary unlocking trigger are respectively located on an upper side and a lower side of the inner ring of the second handle.

10. The hedge trimmer according to claim 1, wherein the power supply comprises a battery pack, the rear machine body is provided with the battery pack, a straight line that passes through a gravity center of the blade assembly and is parallel to an axial direction of the rear machine body is taken as a halving line, and the gravity center of the hedge trimmer installed with the battery pack is located on a side of the halving line.

11. A hedge trimmer, comprising:

a front machine body;

a blade assembly connected to an axial front end of the front machine body;

a rear machine body connected to an axial rear end of the front machine body; and a starting trigger; wherein the front machine body comprises a motor configured to drive the blade assembly to reciprocate and a plurality of lock holes, the rear machine body comprises a power supply circuit electrically connected to the motor and a power supply connected to the rear machine body, and the power supply is configured to supply power to the motor through the power supply circuit;

the rear machine body defines a rotary unlocking trigger that is configured to unlock rotating states of the front machine body and the rear machine body, a first microswitch and an elastic piece; the rotary unlocking trigger comprises a grip part disposed below the starting trigger, a lock part and a rotating shaft between the grip part and the lock part; a side of the lock part defines a lock pin matched with the one or more lock holes and the other side of the lock part that abuts against the elastic piece; when the lock pin engages with one of the plurality of lock holes, the first microswitch is closed and the power supply circuit is conducted; when the lock pin disengages from one of the plurality of lock holes, the rear machine body is configured to rotate relative to the front machine body, the other side of the lock part compresses the elastic piece, so that the elastic piece deforms, the first microswitch is disconnected, and the power supply circuit is disconnected; and the grip part is arranged on a first side of the rotating shaft, the first microswitch is arranged on a second side of the rotating shaft, and the first side of the rotating shaft is opposite to the second side of the rotating shaft.

* * * * *